United States Patent [19]

Delgadillo et al.

[11] Patent Number: 4,470,836
[45] Date of Patent: Sep. 11, 1984

[54] PARISON MOLD AND BAFFLE SYSTEM FOR AN AUTOMATIC MOLDING MACHINE

[75] Inventors: Benigno C. Delgadillo; Oscar B. Narvaes, both of Monterrey; Jose G. Sanchez, Guadalupe, all of Mexico

[73] Assignee: Vitro Tec Fideicomiso, Monterrey, Mexico

[21] Appl. No.: 426,625

[22] Filed: Sep. 29, 1982

[30] Foreign Application Priority Data

Dec. 10, 1981 [MX] Mexico ................................. 190530

[51] Int. Cl.³ ............................................. C03B 7/14
[52] U.S. Cl. ...................................... 65/209; 65/219; 65/242; 65/304
[58] Field of Search ................. 65/300, 304, 242, 209, 65/219, 220, 227, 127

[56] References Cited

U.S. PATENT DOCUMENTS 1,654,731  1/1928  Ingle .................................. 65/304 X
2,433,399  12/1947  Rossler et al. ..................... 65/227 X Primary Examiner—Arthur D. Kellogg
Attorney, Agent, or Firm—Kemon & Estabrook

[57] ABSTRACT

A parison mold and baffle system for an automatic molding machine of the I-S type including a two piece split parison mold with an integral funnel thereon. The funnel portion terminates upwardly in an annular opening with walls of outwardly tapering cross section. A combined blow-down and baffle head has blow-down nozzles, a downwardly facing annular groove which is snugly received on the walls of the funnel in both the blow-down and mold closing baffle positions. Blow-down starts from the initial engagement of the blow-down and baffle head on the funnel and continues until said mold end is completely closed by the baffle.

3 Claims, 3 Drawing Figures

PARISON MOLD AND BAFFLE SYSTEM FOR AN AUTOMATIC MOLDING MACHINE

BACKGROUND OF THE INVENTION

Traditionally production of glass bottles has been done on I-S machines by the blow and blow process. In this process, it is necessary to shape a parison and bottle neck ring with the parison in an inverted position, after which the parison is inverted to its normal position and placed in a finishing mold where it is blown to its final shape. The parisons are shaped in each of the sections of a plural (usually eight) section machine. A funnel is first connected to the parison mold to receive and guide a gob of molten glass so as to deliver it accurately to the parison mold. Following delivery of the gob, a baffle is connected over the funnel to supply a blow-down to insure that the gob settles to the bottom of the mold to fill the neck ring portion, correctly shape the neck ring and insure uniform contact of the glass with the walls of the parison mold. After the blow-down step, the baffle is disconnected and removed, the funnel is disconnected and removed and finally the baffle is again connected. With the funnel out of the way, the baffle functions as the bottom of the parison during the blow-back from the neck ring end which results in final shaping of the parison.

Any attempt to increase the rate of production of the machines may be broken down into a plurality of time periods as follows:

1. Time of shaping the neck ring

During this time, the funnel is connected to the parison mold, a gob of molten glass is dropped through the funnel into the mold, and the baffle is connected to the funnel to supply blow-down which assures filling of the neck ring mold and shaping of the neck ring.

2. Time of mechanical displacement

The gob of glass remains on the inside of the parison mold while the baffle is disconnected and withdrawn, the funnel is disconnected and withdrawn and the baffle is again connected.

3. Blow-back time

The parison is blown to conform it to the inside of the parison mold leaving the parison ready for inversion and deposit in the finishing mold for blowing to final shape.

With the present machines, a substantial number of bottles turn out to be defective due to nonuniform distribution of the glass in the walls of the bottles. The most frequent defect is known as a settle wave and consists of a thin ring of glass which extends around the blown bottle about three fourths of the way up from the bottles. It has been found that the quality of the bottles may be improved by increasing the blow-back time to insure a good inflation of the parison which results in more uniform distribution of glass in the walls of the bottle. However, in order to increase the blow-back time which previously was considered constant for any given type of bottle, the time for mechanical displacement had to be reduced. Reducing the time of mechanical displacement, however, appeared impossible due to the necessity of disconnecting and removing the baffle from the funnel, disconnecting and removing the funnel and then reconnecting the baffle directly onto the parison mold. Any attempt to speed up these movements of connecting and disconnecting were thought to be impossible because it would result in greater frictional losses between the parts. The conventional I-S machines also have the disadvantage that the baffle performs two functions in each shaping cycle, first by supplying a blow-down and then as a true baffle and any attempt to increase the speed of movements was thought to wear out the actuating mechanism more quickly.

U.S. Pat. No. 3,171,723 of 1965 represents one of the prior art attempts at reducing the length of the mechanical displacement time. In this patent, the upper part of the parison mold is shaped like a funnel in order to receive and guide the molten glass gob. However, instead of performing a blow-down in the upper part of the parison mold to insure good contact of the glass with the parison mold walls, a vacuum is created in the neck ring mold part followed by connecting the baffle to the bottom of the parison mold and performing the blow-back. Unfortunately, however, substituting a vacuum in the neck ring for the blow-down of the prior art did not result in uniform contact of the glass with the walls of the parison mold because there was a tendency for the glass to trap air bubbles between it and the parison mold walls which impedes uniform distribution of the glass.

Another prior art attempt to solve these problems may be found in U.S. Pat. No. 3,536,468 of 1970. In this patent, a unitary structure includes the parison molds and a funnel which are also connected with a mechanism for blow-down and spraying of lubricant onto the inside of the parison mold. In this way, the need to connect and disconnect the funnel is obviated and therefore, in a single operation the apparatus will guide, lubricate and perform blow-down. Such apparatus has the advantage that the funnel is connected with the mechanism for blow-down and spraying of lubricant and both are connected as a unit to the parison mold, so that only two operations are necessary, namely, to connect the baffle and perform blow-back. However, this apparatus suffers from being too heavy and bulky for fast movements and thus requires a movement time which is greater than in the standard machines. In addition, the design is somewhat complicated and has wear problems which make it relatively expensive to operate.

A similar showing may be found in U.S. Pat. No. 3,762,860 of 1972 with the difference that a lubricant spray nozzle is included which is shaped to fit a parison mold with a noncircular crosssection to premold the gob and produce parisons and bottles with a noncircular crosssection.

BRIEF SUMMARY OF THE INVENTION

The above and other disadvantages of the prior art are overcome by the improved mold and baffle head of the present invention The separate funnel of the prior art has been made an integral part of the parison mold. The combined baffle and blow-down head includes a downwardly facing annular groove which receives the upper end of the funnel portion of the parison mold to form a substantially fluid tight seal in both the blow-down and baffle positions of this member. With this arrangement, the baffle and blow-down head may be connected to the funnel by means of its entry-exit mechansim to provide from the beginning of its engagement over the funnel a blow-down which assures uniform contact of the glass with the inner walls of the parison mold together with proper shaping of the bottle neck ring and then, it is completely engaged over the funnel, the baffle portion of the head substantially seals the bottle bottom end of the mold during the blow-back which results in final shaping of the parison. Thus, the time for shaping the parison is reduced to a single entry and exit movement of the blow-down head permitting a longer blow-back time and effecting better distribution of the glass in the parison mold. This in turn reduces the mechanical displacement time and permits shorter shaping cycles combined with increased production rate of better quality items.

DETAILED DESCRIPTION OF THE INVENTION

Figure 1:
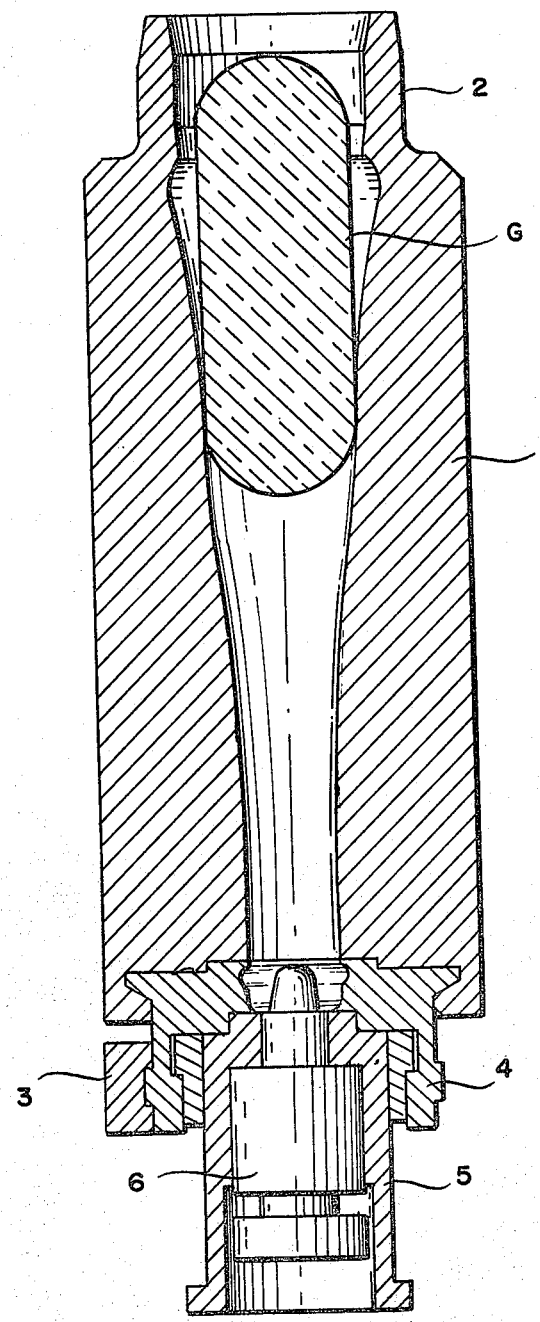
FIG. 1 is a side view in section of a combined funnel and parison mold.

As shown in FIG. 1, the parison mold 1 includes at the bottle bottom end thereof an integral funnel member 2 for guiding the molten glass gob G into the mold proper. The mold, of course, is of the two piece split type as is conventional in this art, and is supported on an arm 3 which also carries the neck ring portion of the mold 4. The blow-back nozzle 5 includes a retractable piston 6 as is also conventional in machines of this type.

As shown in this Figure, the funnel portion 2 of the mold includes a straight cylindrical side wall which terminates at its upper end in an upwardly tapering crosssection.

Figure 2:
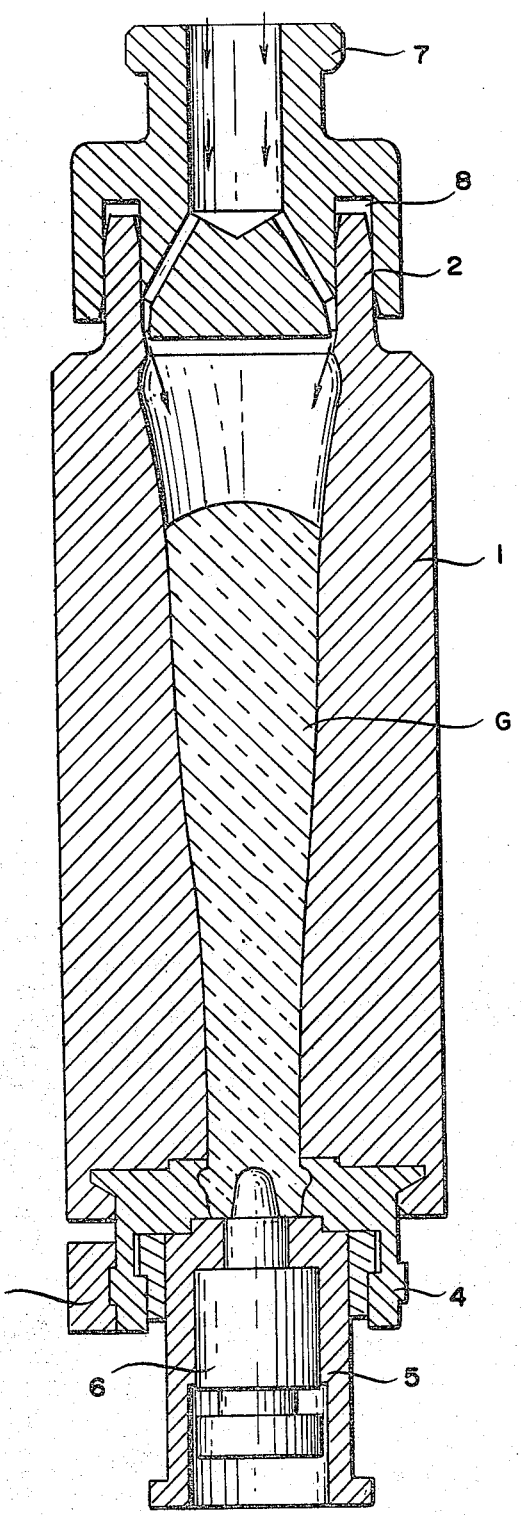
FIG. 2 shows the mold of FIG. 1 with the combined blow-down baffle head positioned on the mold in blow-down position.

Referring now to FIG. 2 of the drawings, the combined blow-down and baffle head 7 includes a downwardly facing annular groove 8 which is sized and configured to be snugly received by the funnel 2 and as the head is lowered it is continuously providing the blow-down as shown in this Figure. The fit between the funnel and the walls of the groove 8 effectively seal the bottle bottom end of the mold and permits blow-down to proceed as the blow-down and baffle head is entering through the central bore and nozzle passageways as indicated in this Figure.

Figure 3:
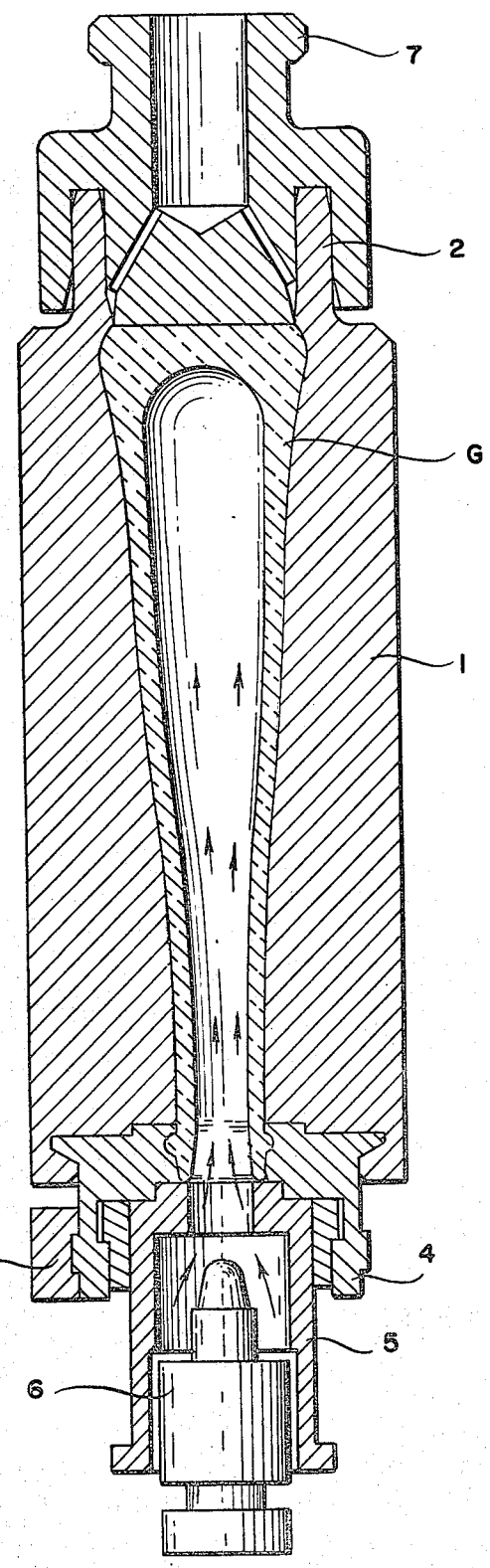
FIG. 3 is a view similar to FIG. 2 but with the baffle head positioned to close the bottle bottom end of the mold and with the blow-back nozzle activated to achieve final shaping of the parison.

Referring now to FIG. 3, the blow-down baffle head is shown in its baffle position in which the upper end of the funnel is in contact with the bottom of the groove 8. In this position, the baffle portion of the head forms the bottle bottom end of the mold and in this position, the blow-back phase takes place to effect final shaping of the parison. As shown in this Figure, the piston 6 has been retracted from its position in FIG. 2 and blow-back air is passing through the blow-back nozzle into the parison interior.

With this arrangement and design of parts, it becomes possible to perform the blow-down in a single continuous movement of the blow-down baffle head during its entry travel and without the escape of blow-down air and without loss of time for it to reach the funnel. Blow-down time can be adjusted by varying the length of the funnel and or the vertical travel of the blow-down head if desired.

The downwardly facing annular groove of the blow-down and baffle member and the vertically extending annular side walls of the funnel portion of the mold, are only preferred embodiments of the invention in order to effectively guide and center the engagement therebetween.

While a preferred embodiment of the present invention has been herein shown and disclosed, applicants claim the benefit of a full range of equivalents within the scope of the appended claims.

We claim:

1. In an automatic blow molding machine of the I-S type, a parison mold and baffle system comprising:
   a two piece split parison having at the mold bottom end thereof an integral open funnel portion;
   a unitary blow-down nozzle and baffle member said baffle being sized to seal the bottom of said funnel portion; and
   means on said member affording continuous sealing engagement with said funnel portion of said parison mold in and between each of two successive positions in the first of which said baffle is positioned between the top and bottom of said funnel permitting blow-down of a glass gob into said mold and in a second position in which said baffle is positioned at the bottom of said funnel portion to block communication between said nozzle and said mold and seal the bottom of said mold permitting blow-back from the opposite end of said mold to finally shape the parison.

2. A parison mold baffle system as defined by claim 1 in which said means on said member comprise an annular downwardly facing groove sized to closely receive the walls of said funnel in both said first and second positions.

3. A parison mold baffle system as defined by claim 2 in which the outermost ends of said funnel are tapered outwardly thereof to facilitate guiding and centering of said blow-down nozzle and baffle member with respect to said mold.

* * * * *